Dec. 14, 1965  L. E. SODERQUIST  3,222,724
APPARATUS FOR SHAPING AND CURING TIRES
Filed Nov. 22, 1963  7 Sheets-Sheet 1

FIG. 1

INVENTOR.
LESLIE E. SODERQUIST
BY Hamilton & Cook
ATTORNEYS

FIG. 4

INVENTOR.
LESLIE E. SODERQUIST

FIG. 5

INVENTOR.
LESLIE E. SODERQUIST
BY Hamilton & Cook
ATTORNEYS

United States Patent Office 3,222,724
Patented Dec. 14, 1965

3,222,724
APPARATUS FOR SHAPING AND
CURING TIRES
Leslie E. Soderquist, Silver Lake, Ohio, assignor to McNeil
Corporation, Akron, Ohio, a corporation of Ohio
Filed Nov. 22, 1963, Ser. No. 325,552
9 Claims. (Cl. 18—17)

The present application is a continuation-in-part of my earlier application Serial Number 187,749, filed April 16, 1962, now abandoned.

The present invention relates to improvements in tire presses for shaping and curing unvulcanized tire bands within relatively movable or separable mold sections. More particularly, the invention relates to improved mechanisms for controlling the shaping of unvulcanized tire bands during closing movement of the press mold sections.

Production of automobile and truck tires begins with "building." The unvulcanized, uncured or green tire is made by the sequential assembly, usually on a collapsible "building drum," of the various components of a cylindrical uncured tire structure, including the bead wire cores, bead reinforcements, the body plies, ply reinforcements, various chafer and breaker strips and plies, the tread stock, etc. The cylindrical uncured tire structure is often referred to as a "pulley band," hence the generic term "unvulcanized tire band" meaning a cylindrical uncured tire structure that has been built but not yet finally shaped and vulcanized.

The term "unvulcanized tire band" is also in use to describe uncured or green tires which have been at least partially shaped during the building operation. For example, heavy duty tires are being built with plies of rubber coated, woven or braided wire, metallic or cord reinforcements. Such reinforced tire bands are not as readily formable as tire bands using rayon, nylon or cotton plies and so it has been a practice to preform or partially shape the reinforced tire band before delivery to the press to facilitate the final shaping and curing operations.

In the operation of "shaping," an unvulcanized tire band is altered by controlled deformation or expansion or radial distension from the cylindrical or semi toroidal form in which tire bands are built, to the full toroidal or tire shape form of a cured tire as defined by the molding surface or contours of the mold sections when closed. During shaping, the tire bead portions are moved together to a predetermined spacing, the tire tread portion is moved outwardly to define the maximum diameter, and the connecting wall portions are moved together from vertical to become substantially horizontal. To enable the various components of the tire band structure to stabilize, adjust or acclimate to their changing orientation, it is very desirable that the shaping operation take place in a precise, definite and controlled manner, as determined, for example, by the variables of the construction of the tire being cured.

The shaping operation takes place after a tire band is positioned relative to a mold section in registry with the forming mechanism and during closing movement of the mold sections and before a final curing and vulcanizing operation.

Shaping of a tire band is accomplished by means cooperating with a forming mechanism for the application of pressure interiorly of a tire band. As shown, the forming mechanism is of the permanent bag, bladder or diaphragm-type extending above a lower mold section with the shaping pressure being supplied interiorly of the bag and through the center area of the mold section. However, the principles of the invention would apply with equal facility to a forming mechanism carried by or projecting from an upper mold section. Also, a control mechanism according to the invention could be used with "bagless cure" center mechanisms in which the pressure shaping and curing medium is in direct contact with the interior of the tire band.

The general object of the present invention is to control the shaping of an unvulcanized tire band during closing movements of separable press mold sections by providing an improved mechanism correlating the rate of press closing movement with the rate at which the tire band is shaped. A novel control mechanism includes a sensing arm which is moved by a transmission means along a predetermined path or in a plane normal to the axis of an unvulcanized tire band being shaped. Within the transmission means is a control element, specific for a particular size, shape or style of unvulcanized tire band but having certain and definable characteristics for moving the sensing arm in a predetermined motion relative to the shaping band.

Still further, it is an object of the present invention to provide a control mechanism which will regulate the shaping of different sized tires being cured in a "dual-mold" press; which will continuously rather than intermittently control the rate of shaping; which does not normally require stopping of the press after beginning of the closing movement; and which does not interfere with other press functions nor require extensive alterations and changes when applied to existing press structures.

Still further, it is an object of the present invention to provide control means and circuitry to detect conditions of overshaping and undershaping of unvulcanized tire bands in a tire shaping and curing press and to regulate and actuate press closing means and shaping medium supply means in response to said conditions.

These and other objects of the invention, as well as the advantages thereof, will be apparent in view of the following detailed description and the attached drawings.

*General description*

A tire curing press suitable for practice of the invention has separable upper and lower mold halves or sections, 20 and 21 and axially centered forming mechanisms or diaphragm-type shaping means. A lower mold section 21 is carried on a bed plate 22 supported by a base or frame 23. Beneath each mold section 21 the base 23 has a central well or bore 24 through which extends the operating mechanism for the diaphragm type shaping means or forming mechanism indicated generally at 25.

Figure 6:
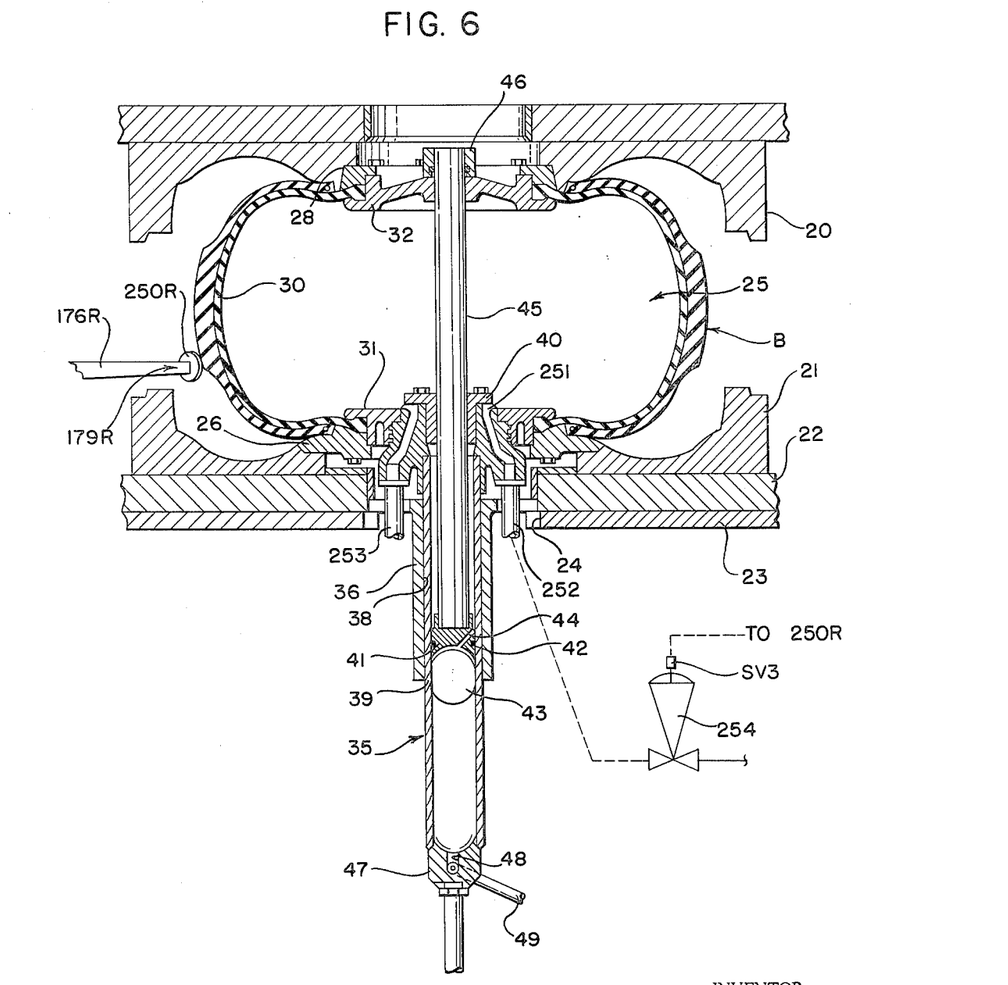
FIG. 6 is an enlarged view in section, specially taken substantially as indicated on line 6—6 of FIG. 3, showing details of the forming mechanism.

Referring to FIG. 6, the center mechanism 25 includes a movable annular lower bead ring 26 providing a circular seat for the lower beaded edge of an unvulcanized tire band (B) and a movable annular upper bead ring 28. The molding surfaces of the ring 26 and of the lower mold section 21 define the lower portion of a cured tire (T). The upper portion of a tire T is defined by the molding surface of the upper mold section 20. As shown, the bag 30 of the shaping mechanism is an elongated deformable, heavy walled cylinder clamped at the lower end between a plate ring 31 and bead ring 26 and at the upper end between another plate ring 32 and bead ring 28. The bag 30 is manufactured from rubber, rubberized fabric or similar suitable material known to the art, in a bag mold. It is preferred that the bag mold be designed so that the finished bag, though cylindrical, is also somewhat barrel shaped; that is, has a slightly enlarged medial portion so that the bag in use and when elongated or extended after curing operation (FIG. 1) will collapse in four or more convolutions or folds.

The upper bead ring 28-plate ring 32 assembly is moved relatively to or away from the lower bead ring 26-plate ring 31 assembly by a pressure fluid actuated cylinder mechanism 35. A bell-shaped housing 36 is fitted in the central bore 24 of the press base. The housing 36 is hollow and has a downwardly extending stem defining a bore 38 for slidably receiving a cylinder casing 39. The upper end of casing 39 carries an exteriorly bolted gland member 40 for axial adjustment of the plate ring 31.

Within the casing 39 is an inverted cup-shaped piston 41 having a piston ring 42 which serves to keep the interior of the cylinder free of deposits. Seated against the underside of the piston is a ball 43 preferably composed of butyl rubber or some similar rubbery or rubber-like material. The ball 43 is preferably somewhat larger in diameter than the internal diameter of the casing so that the ball will be somewhat flattened and compressed at its central zone, making a tight sliding fit with the cylinder. Any condensate of pressure fluid medium which collects above the piston 41 will exhaust through a diagonal passage 44 in the piston and serve to lubricate the ball. The piston 41 carries a piston rod 45 which extends axially through the gland member 40 and carries the upper plate ring 32. The upper bead ring 28 may be bolted to the plate ring 32 and secured axially for adjustment of bag height by a locking collar 46 clamped on the upper end of piston rod 45, which defines the axis of the forming mechanism 25 and of a tire band B in registry therewith.

At the lower end of cylinder casing 39 is a head cap or plug 47 having an inlet bore 48. To raise the upper bead ring 28 plate ring 32 to maximum elevation above the lower mold section 21 and away from the lower ring assembly 26 and 31 fluid under pressure is supplied through a suitable conduit 49 and into bore 48.

To strip the tire T from the lower mold section 21 after curing, both bead ring-plate ring assemblies are raised together, in a conventional manner, by an actuating means (not shown) connected to the lower end of the cylinder casing 39 which is raised upwardly within the bore 38 of the bell-shaped housing 36. Thereafter, the bag 30 is elongated as described above and a cured tire is discharged from the press by an unloading mechanism indicated generally at 50.

Figure 1:
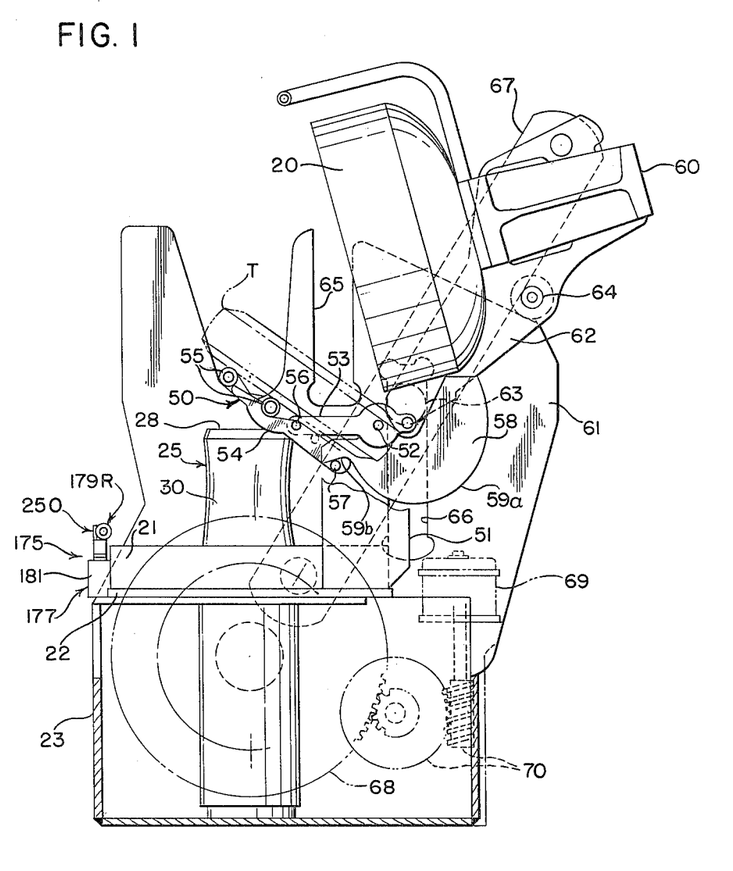
FIG. 1 is a side elevation, partly in section, of a press in open position showing discharge of a cured tire by an unloading mechanism, and further showing the forming mechanism in an extended condition.

Referring to FIG. 1, an unloading mechanism 50 is attached to a press by a center bracket or stanchion 51 mounted on the press bed plate 22 between and to the rear of the lower mold sections. A short shaft 52 extends transversely of the stanchion 51 and there are suitable power means (not shown) provided to rotate the shaft 52. An elongated arm 53 is attached to each outboard end of the shaft 52 and extends forwardly on either side of the stanchion 51. A conveyor frame 54 having rollers 55 to contact the under side of a cured tire T is pivotally carried as at 56 on the end of each arm 53. On the rear corner of each conveyor 54 is an inwardly extending cam follower means 57 which is maintained in contact with the surfaces of a cam plate 58 during rotation of the shaft 52. The cam plate 58 has a downwardly directed asynarcuate curvilinear surface 59a intersecting a downwardly inclined linear surface 59b for controlling forward movement of the conveyor frames 54 during the cured tire unloading operation. As shown in FIG. 1, the forward movement terminates at an extreme position of forward and upward travel so that a tire T may be discharged to the rear of the press onto a take-away conveyor (not shown) or for positioning in a suitable postcure inflation apparatus as desired (also, not shown).

The movable upper mold sections 20 are supported from a crosshead 60. On opposite sides of the lower mold sections 21 are guide plates 61 extending upwardly from the press frame 23. At each end of the crosshead 60 are guiding arms 62 having roller means 63 and 64 movable within front and rear vertical guideways 65 and 66 in the guide plates 61. The crosshead 60 is pivoted to the upper end of a pair of operating links 67 on opposite sides of the press and outside of the guide plates 61. The links 67 are actuated by large bull gears 68 driven by a suitable motor 69 and gear train 70 to raise and lower the crosshead 60 for opening and closing of the press.

Press elements 20 to 32 and 60 to 70 described above, are shown in a number of prior art patents to the inventor, including United States Patent No. 2,808,618 to which reference is made for such details of presses as are required to more fully understand the invention. These presses are constructed so that it is possible to obtain a maximum "tilt-back" of the upper mold section and clearance above the lower mold section without loss of valuable head room above the press. In this type of press, the operating mechanism moves the upper mold section 20 in a vertical path toward the lower mold section 21 during the last part of the closing movement when the uncured tire band B is being distended during the shaping operation. This type of press is preferred, but it will be apparent that presses of other types and designs having relatively movable mold halves and an axially centered forming mechanism could be used in the practice of the invention; for example, presses in which the upper mold section is not moved entirely out of the way and to one side of the press, or presses in which the movable mold section is moved in a straight line throughout its entire cycle, or presses in which the forming mechanism is carried on the upper or the movable mold section, so long as the unvulcanized tire band B is appropriately located either manually or by automatic loading apparatus in registry with a forming or center mechanism and relative to a mold section, before final closing of the press and shaping and curing of a tire T.

In another form of center mechanism (not shown herein), the diaphragm or bag 30 could be a deformable and radially distensible structure open at the lower end and initially elongate, having the shape or form of a cylindrical cap. In this form, the upper or closed end of the bag would be substantially thicker than the side wall, having what is best described as a plano-convex cross-section. During the press closing movement, and shaping and curing, the convex upper surface of such a bag would be concentrically contacted by a concave mold plate positioned axially of the upper mold section 20.

Still other forms of center mechanisms, in which the pressure shaping and curing medium is in direct contact with the interior of the tire band B, the "bagless" cure center mechanisms, could also be used. Reference is made to the inventor's prior United States Patents Nos.

2,997,740 and 2,812,546 for details of such center mechanisms.

Press elements 35 to 49, for actuation of the particular center mechanism shown, are generally as shown in United States Patent No. 2,808,618 referred to above. However, other forms of actuation or cylinder mechanisms, such as shown in the inventor's prior United States Patents No. 2,775,789 and No. 2,715,245 and No. 2,699,572, could also be used if desired.

The press elements 50 to 59 for automatic unloading of a tire T are exemplary only. For other suitable mechanisms as are desired or required for the operations of tire stripping, bag extraction and extension, and removal or discharge of the tire from the press, reference is made to the inventor's prior United States Patents No. 2,911,670, No. 2,832,992, No. 2,832,991 and No. 2,495,663.

*The shaping control*

A shaping control mechanism according to the invention, indicated generally by the numeral 175, positively correlates closing movement of each set of press mold sections with shaping of a particular and specific size, shape or style of a tire band B. As the invention is shown and described herein, if the radial distension of a tire B being shaped exceeds or advances beyond a predetermined rate of press closing, shaping of the tire band is momentarily interrupted or slowed. Further, if shaping or radial distension of a tire band B is not proceeding according to a predetermined rate or if a condition of "undershaping" is present, flow of shaping medium is appropriately increased or regulated; and, if the condition is not rectified, press closing is momentarily interrupted or slowed.

A control mechanism 175 is located at the side of a mold section, preferably between and to the front of the lower mold sections 21. A control mechanism preferably has two sensing arms 176 extending in opposite directions one for each set of mold sections (20, 21). Each sensing arm is preferably rotatably mounted and is arcuately movable in a plane normal to the vertical axis of the forming mechanism 25 and to a preselected portion of a tire band B. The control mechanism 175 further includes a transmission means 177 having elements for synchronizing closing movement of the press mold sections with radial distension of a tire band B by the application of shaping pressure in cooperation with the forming mechanism. Each transmission means preferably has a cam 178 normally moving the sensing arms 176 in a controlled and programed motion relative to a distending tire band being shaped. Each cam 178 is interchangeable or replaceable and has control surfaces specifically adapted for each particular tire band being shaped and cured. Carried on each sensing arm is a sensor, transducer or control means 179 to regulate or interrupt, the shaping pressure upon contact of a distending tire band as caused by shaping exceeding the rate of press closing.

Figure 4:
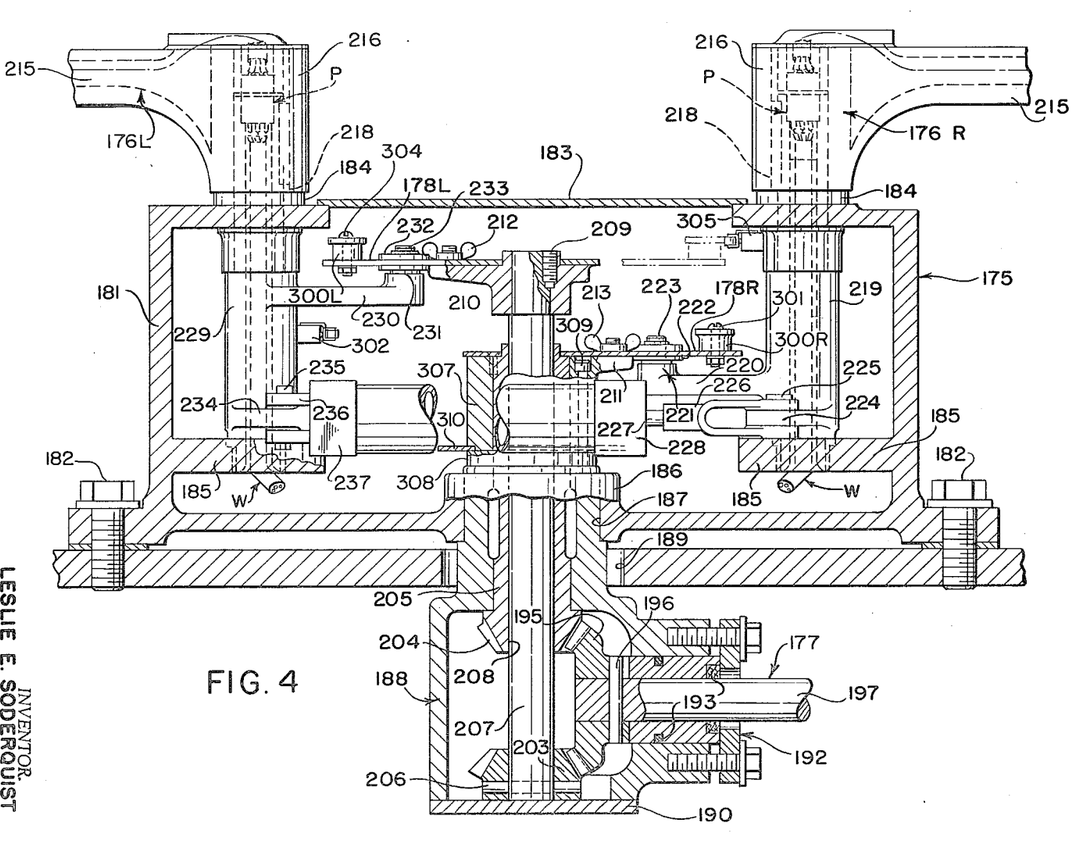
FIG. 4 is an enlarged fragmentary front view in section, showing details of an improved shaping control mechanism according to the present invention.
Figure 5:
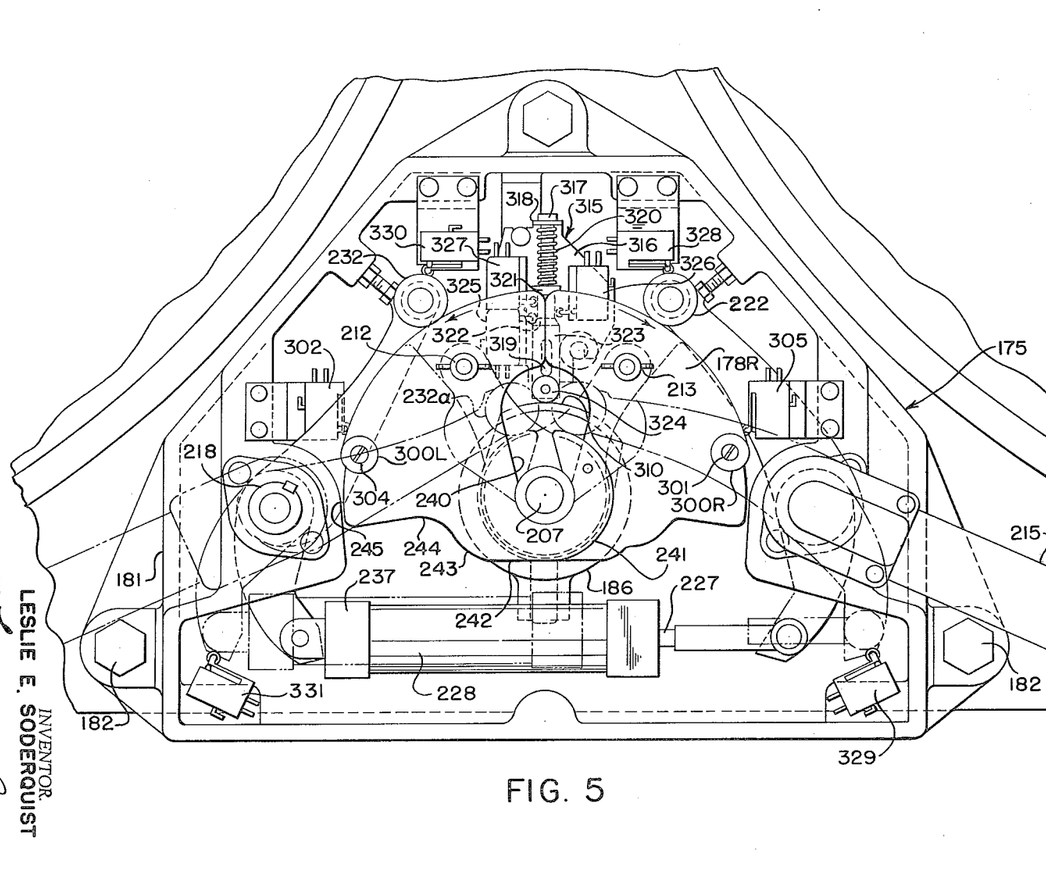
FIG. 5 is a plan view showing the shaping control mechanism as in FIG. 4.

Referring to the drawings, particularly FIGS. 4 and 5, a control housing 181 is attached to the press bed plate 22 as by cap bolts 182. The top of housing 181 is closed by a removable cover 183. As shown, the rear walls of the housing 181 are generally triangular in orientation to conserve space and permit of installation in close proximity to the adjacent mold sections 21. This is advantageous both for new presses and for installation of control mechanisms 175 in the field on existing presses.

On the top outer surface of housing 181, on opposite sides and near to a front corner, are two sleeve bearings 184 having through bores. Near the bottom inner surface of the housing and extending inwardly from the walls are two fixed bracket arms 185 having socket bore bearings. Each set of bores are vertically aligned for rotatable mounting of the sensing arms 176, as described in further detail below. Also on the bottom surface of the housing 181 is a symmetrically located stud boss 186. The bore 187 of the boss 186 is relatively large and accurately machined to receive a downwardly extending gear housing 188 containing certain input elements of the transmission means 177.

The gear housing 188 has a hollow stem extending upwardly through a hole 189 in the press bed plate 22 and tightly fitted within the stud bore 187. The bottom side of the gear housing is closed by a cover plate 190. Lubrication for the gear elements within the gear housing 188 may be supplied through a fitting (not shown) opening to the inside of the gear housing 188.

One side of the gear housing 188 (preferably the right side when looking from the front of the press) is bored to receive a plug sleeve bushing assembly 192 fitted with peripheral and axial oil seals 193. The bushing assembly 192 has a horizontal bore rotatably mounting the end of a long shaft 197. A bevel gear 195 is fastened as at 196 to the inboard end of the long shaft 197.

Figure 2:
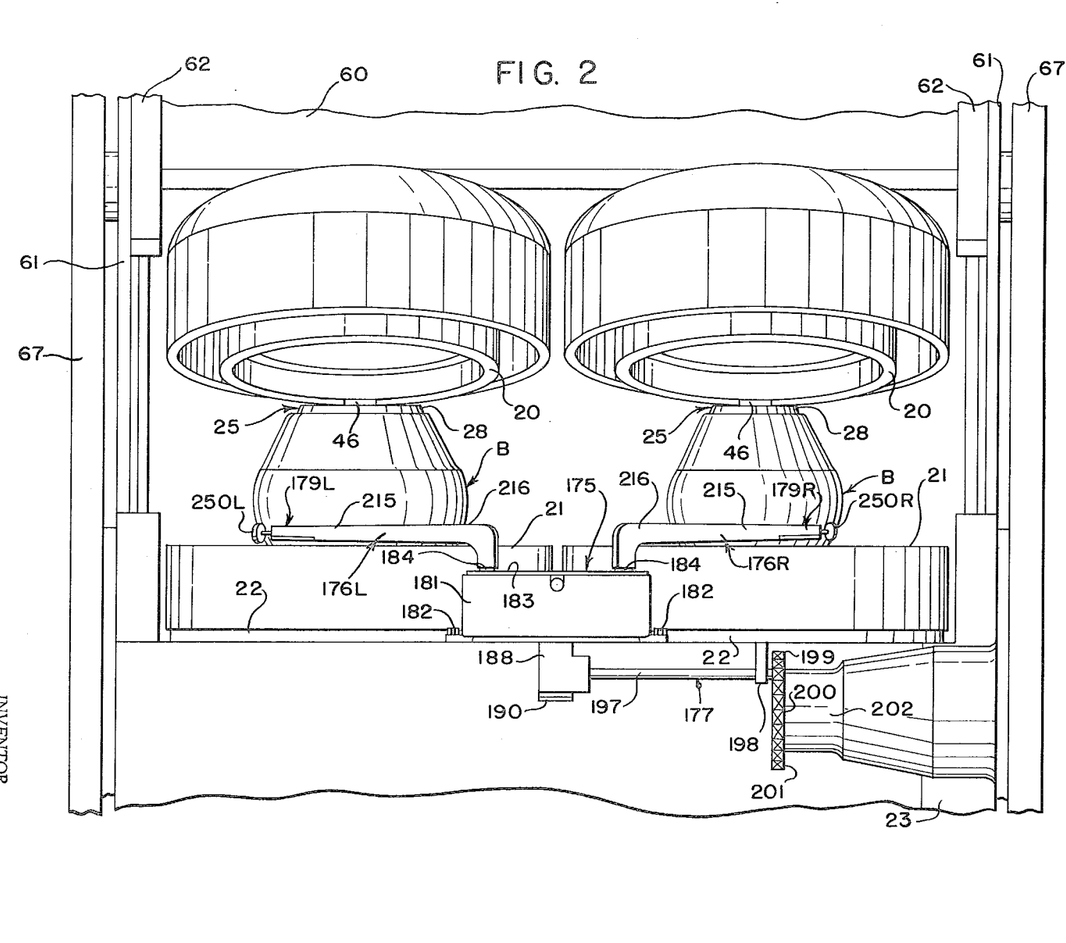
FIG. 2 is a front view, broken away at top and bottom, showing a dual-mold press during the closing movement; it will be noted that the tire bands B being shaped are shown as being of different sizes, an important advantage of shaping control according to the concepts of the invention.
Figure 3:
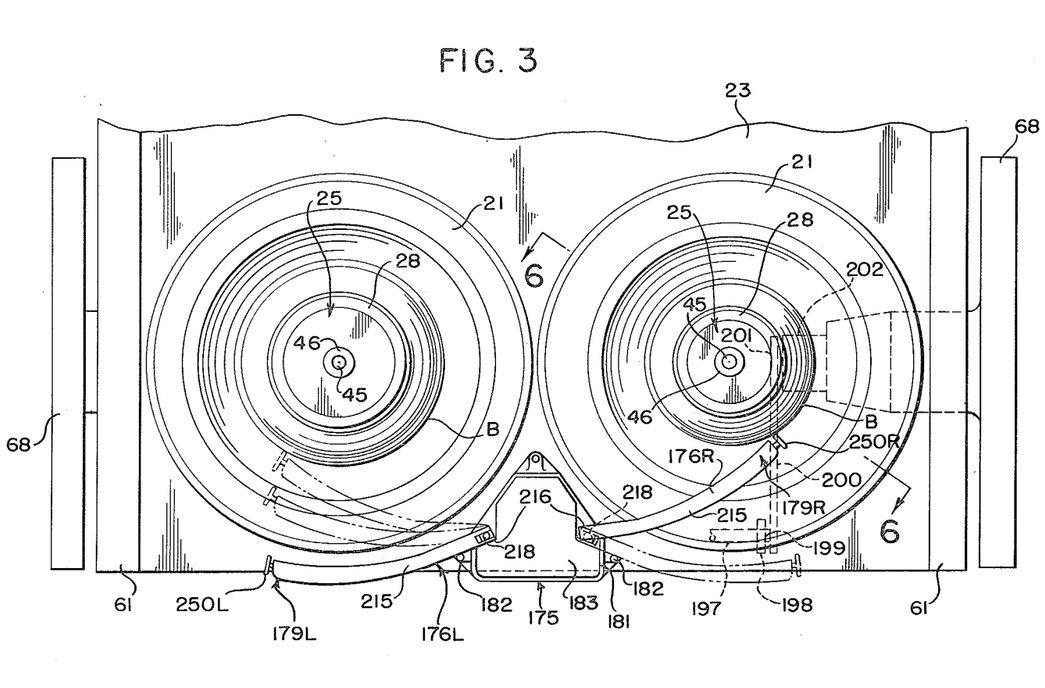
FIG. 3 is a plan view of a press as in FIG. 2, looking down on the lower mold sections and showing the operative relation of a control mechanism to the radially distending tire bands B during the shaping operation.

Referring to FIG. 2, the long shaft 197 is journaled near the outboard end in a bracket 198 attached to the underside of the press bed plate 22. On the outboard end, the shaft 197 carries a toothed sprocket 199. As best shown in FIG. 3, the shaft sprocket 199 is connected by a chain 200 to a toothed sprocket 201 fitted coaxially of the inboard end 202 of the hub of a press drive bull gear 68. The ratio between sprockets 199 and 201 may be selected as desired.

A one to two ratio of a sprocket 199 to a sprocket 201, that is a ratio in which the sprocket 199 is the smaller and rotates twice for one rotation of the bull gear, would be satisfactory. However, this ratio is exemplary only and may be varied according to the particular presses involved and for consistency with the movement of the sensing arms 176, as described in further detail below.

Referring again to FIG. 4, the teeth of bevel gear 195 are meshed with teeth of a horizontal bevel gear 203 and the horizontal teeth 204 on the lower end of a rotating sleeve 205. When the long shaft 197 is rotated by the press drive, corresponding rotation will be imparted by the gear 195 equally but in opposite directions to the gear 203 and sleeve 205.

The bevel gear 203 is fastened as at 206 to the lower end of a vertical shaft 207. The shaft 207 is rotatable in an axial bore 208 in sleeve 205 and terminates at the upper end in a threaded keyway and key or cap screw 209 for mounting of an upper cam support plate 210. The upper end of the sleeve 205 coaxially surrounding the shaft 207 is adapted for mounting of a lower cam support plate 211. A control cam 178L is detachably secured to the upper cam support plate 210 by a wing nut 212. A control cam 178R is detachably secured to the lower cam support plate 211 by a wing nut 213.

Each sensing arm 176 has a main portion 215 extending a substantial distance from the control housing 181 in a substantially horizontal plane. At the base end, each sensing arm has a downwardly directed portion 216 keyed to receive the upper end of a vertical mounting shaft 218. Each mounting shaft is rotatably journaled in an aligned set of housing bearings 184–185 and is removable for maintenance of the press or for changing of mold sections. Additionally, as shown in FIG. 4, each shaft 218 may be axially bored for electrical wires W and may carry at its upper end a bayonet or prong plug P for detachable connection to conductors extending through the arms 176 to the sensor means 179.

The mounting shaft 218 for a sensing arm 176R joins with an integral diametrically larger hub portion forming an arm actuation spindle 219. Near the lower end of spindle 219 is a long laterally extending lever arm 220. At the outer end of arm 220 is a flat boss 221 for rotatably mounting an upwardly directed cam follower means such as a roller 222, as by a roll pin 223. Also near the lower end of spindle 219 is a laterally extending clevis arm 224 adapted for attachment, as by a pin 225, to a yoke 226 fitted on the end of an extensible rod 227 of a double-acting fluid pressure actuated cylinder 228.

The mounting shaft 218 for a sensing arm 176L joins with an integral diametrically larger hub portion forming an actuation spindle 229, similar to spindle 219. Near the upper end of spindle 229 is a lever arm 230, similar to arm 220. At the outer end of arm 230 is a flat boss 231 for rotatably carrying an upwardly directed cam follower means such as roller 232, which is attached as by a roll pin 233. Near the lower end of spindle 229 is a clevis arm 234 adapted for attachment, as by a pin 235, to a yoke 236 attached to base end 237 of the cylinder 228.

The cylinder 228 is actuated by fluid pressure supplied through suitable conduits (not shown). The actuation of cylinder 228 is controlled by circuitry, as described more fully below, in a suitable manner so that after an uncured tire band B is located in registry with a forming mechanism 25 and a mold section (21), the piston rod 227 will be extended to move the sensing arms 176 on the respective mounting shafts 218, into the active position. Using FIG. 5 as a reference view, extension of the piston rod 227 will rotate sensing arm 176R counter-clockwise and arm 176L clockwise. This rotation will continue until the cam followers 222 and 232, contact radially inner contour surfaces of control cams 178R and 168L, respectively.

Referring now to the plan view of FIG. 5, one preferred arrangement of electrical limit switches or direct sensing elements is shown in relation to switch actuation elements, it being understood that various modifications in arrangement and substitutions of types of direct sensors, as well as inferential sensors, may be effected to achieve the functional results of the present invention, all without departing from the spirit of the invention.

Each control cam 178 preferably carries an actuator roller 300 mounted near the outermost periphery thereof at a predetermined position thereon for actuation of switches during the rotation of the cam by the previously described transmission means which are synchronized with the press closing elements. Although a weld, notch, or other protrusion on the lateral edge of cam 178 may be employed instead of a roller 300, the latter is preferred. For example, cam 178R has an upwardly directed actuator roller 300R mounted thereon as by screw 301. Actuator roller 300R is positioned and aligned to sequentially actuate or trip limit switch 302. Actuation of switch 302 initiates release or exhaust of fluid pressure from the cylinder mechanism 35, thereby relaxing and removing the pressure which vertically extends the right hand bag or forming mechanism 30 preparatory to the initiation of the flow of shaping pressure medium into the right hand bag 30. The means effecting these functions will be described more fully below with relation to preferred circuitry and operational sequence.

Control cam 178L also has an upwardly directed actuator roller 300L rotatably mounted thereon by roller screw 304. Actuator roller 300L is aligned to sequentially actuate limit switch 305, which initiates control of fluid pressure to the cylinder mechanism 35 of the left hand band forming mechanism.

Referring to FIGS. 4 and 5, and particularly to the partial cutaway view in FIG. 4 in the vicinity of the pressure fluid cylinder 228, the lower control cam support plate 211 has a downwardly extending sleeve portion 307 coaxially secured to rotating sleeve 205. Sleeve portion 307 is secured to a collar 308 as by long countersunk cap screws 309, and an actuator cam 310 is detachably secured or sandwiched between the sleeve portion 307 and collar 308 so that actuator cam 310 rotates with the lower control cam support plate 211 and sleeve 205.

As best seen in the plan view of FIG. 5, the actuator cam 310 is adapted to operate a plunger switch assembly 315 mounted on a base plate 316 secured within housing 181. A plunger rod 317 is carried on plate 316 for translation in a direction radially of the axis of rotation of the cams (178, 310) by a fixed bracket bearing 318 and guide pin and slot means 319. The plunger rod 317 is biased radially inwardly toward the axis of cam rotation by a spring extending between bracket bearing 318 and a collar 321 located medially of the plunger rod 317. Located radially inwardly of the collar 321 there is an enlarged shoulder portion 322 of the rod 317 joining with an enlarged shank end 323 which carries a roller 324 for operative mating engagement with the actuator cam 310. The plunger switch assembly also preferably has three limit switches mounted on the base plate 316 for operative engagement with and actuation by the shoulder portion 322 of plunger rod 317.

A first limit switch may be functionally designated a "final check" switch 325, which is actuated by shoulder 322 and is preferably wired into the press closing circuitry so that closing movement is momentarily retarded, slowed, or even interrupted during the final increment (e.g., 4″) of travel of mold closure so that the sensors on the arms 176 may detect undershaping conditions in the tire bands B. If either band B is undershaped, the appropriate arm sensor will automatically initiate corrective control means.

The second or "cut-off" switch 326 is positioned radially outwardly of final check switch 325 and is actuated by shoulder 322 at a time in the press closing cycle sequentially after the actuation of switch 325. The actuation of cut-off switch 326 completely removes arms 176 from between the mold sections and shuts off the supply of shaping medium to the tire bands B.

The third or "shut-off" switch 327 is actuated by shoulder 322 and performs an interlocking function in the press closing circuitry (not shown) by opening the power feed to the press closing elements when cam 310 has advanced to a timed position corresponding to the fully closed positions of the upper and lower molds.

Four additional switches are preferably included to perform safety interlock as well as control initiation or "set-up" functions in the circuitry which effects individual control of shaping of each tire band B in a dual press. For example, switch 328 is positioned for actuation by lever arm 220 when the right hand arm 176R is in the fully withdrawn position; and switch 329 is positioned for actuation by lever arm 224 when the arm 176R is in the innermost position within the molds. Similarly, switch 330 is actuated by lever arm 230 to detect whether the left hand arm 176L is fully withdrawn; and switch 331 is actuated by lever arm 234 to detect whether the arm 176L is in the innermost position.

The above detailed description of actuator cam 310 and plunger switch assembly 315 is exemplary only, and it will be understood that additional switches or sensors and additional actuating elements (e.g., collars and shoulders) can be utilized as required for a particular physical application. These and other variations in arrangement and circuitry are contemplated within the scope of the invention.

Figure 7:
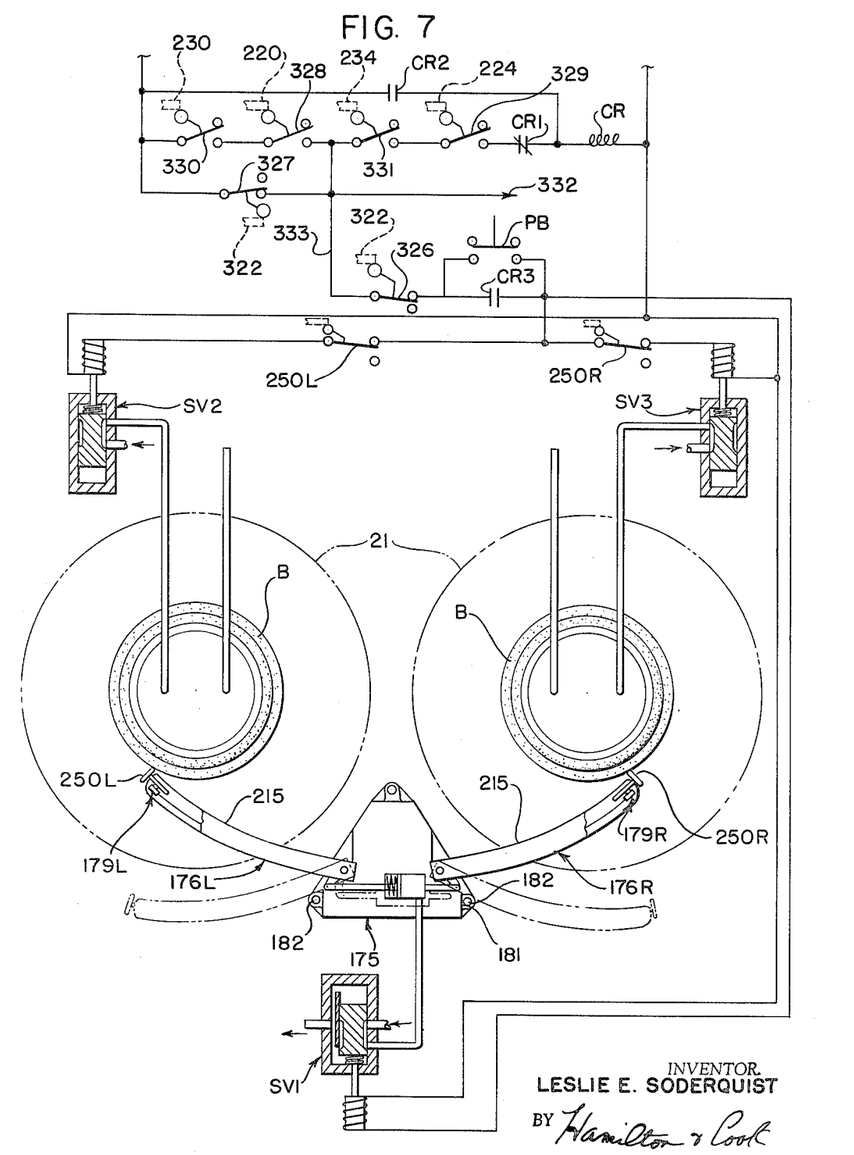
FIG. 7 is a partial schematic wiring and piping diagram according to one preferred embodiment of the invention, in which the functional or operative relation of the control mechanism, circuitry and piping are shown.

Referring to FIG. 7, the functional schematic diagram therein illustrates a preferred form of circuitry and piping according to the present invention. Left arm "out" limit switch 330, right arm "out" limit switch 328, left arm "in" limit switch 331 and right arm "in" limit switch 329 are connected across the power lines in series with a relay coil CR and an interlock relay contact CR1 which is normally closed when the relay coil CR is not energized. The power lines are energized by other press circuitry at the beginning of the press closing cycle and remain energized until the press is fully closed. A shunting or "seal-in" circuit is also provided by seal-in relay contact CR2 which is normally open when the relay coil CR is not energized. The limit switches (328–331) are normally held open when not actuated or tripped by their respective mechanical actuator elements (220, 224, 230 and 234) as explained above with reference to the mechanical layout or arrangement, and these four limit switches comprise a series circuit of safety interlocks and set up switches to prevent damage to the arms 176 and to initiate shaping control.

The arm "out" switches 330 and 328 also provide a feed for the press closing circuit lead 332 which initiates press closing when the arms 176 are fully withdrawn from the open mold sections. A parallel feed path is provided by limit switch 327 in the plunger switch assembly 315, which, in cooperation with relaying in the press closing circuitry (not shown), permits uninterrupted press closing operation simultaneously with programed and synchronized shaping control. The press closing operation is uninterrupted except at predetermined times in the cycle when the movement is slowed or stopped by check-point sensors (e.g., final check switch 325) wired into the press closing circuitry.

Limit switch 327 is the key set-up switch and is normally closed when the arms 179 are in. It provides a feed for the shaping control circuitry at all times when the arms are in and provides an initial feed path for energizing relay coil CR through switches 331 and 329 and relay interlock contact CR1, the relay coil CR, thereafter, being sealed in or self-energized through its contact CR2.

A branch feed path 333 applies voltage to the solenoid and valving portion or output of the circuit through the paralleled feed paths formed by switches 330 and 328 and by switch 327. That is, when the arms are fully withdrawn or at commencement of the press closing cycle, the feed circuit is through switches 330 and 328; while, after the arms have been moved inwardly between the mold section, the normally closed switch forms the feed circuit to branch path 333.

Branch path 333 is connected to "cut-off" switch 326 in plunger switch assembly 315 which is normally closed but is tripped and held open by plunger rod shoulder 322 during the final increment of mold travel in the press closing cycle. A normally open relay contact CR3, which is closed when relay coil CR is energized, connects in series with cut-off switch 327 to energize the solenoids or output elements. A manual override means is provided by momentary contact pushbutton PB which shunts the relay contact CR3 and permits manual actuation of the shaping control at any time during the press closing cycle except during the final increment of mold closure travel.

The feed circuit through switch 326 and relay contact CR3 energized solenoid valve SV1 to introduce pressure into spring loaded cylinder 228 to swing arms 176 inwardly within the mold sections into contact with the tire bands B, after which time the individual arms are rotated outwardly at a predetermined rate, according to programed cam means 178, with the rotation being synchronized with the press closing operation by transmission means, all as more fully described above.

The feed circuit through switch 326 and contact CR3 also energizes solenoid valves SV2 and SV3 through normally closed arm sensors or switches 250L and 250R, respectively. Solenoid valves SV2 and SV3, when energized, introduce shaping pressure medium into the bags or forming mechanisms within tire bands B in the left and right hand molds, respectively.

Arm sensor 250L is normally closed, but will be mechanically actuated or tripped open by tire band B in the left hand mold if the radial distensions of the band exceeds a predetermined rate as determined by the programed and synchronized rate of outward rotation of the arm 176L. Thus, the tripping open of sensor 250L will de-energize solenoid valve SV2, thereby interrupting flow of shaping medium and correcting conditions of overshaping. The right hand band shaping control circuitry (250R, SV3) which is wired in parallel with the left hand band shaping circuitry, operates in an identical manner to independently correct overshaping of the band in the right hand mold. It will be understood, of course, that other sensor and valve elements may be substituted in this shaping control circuitry to effect regulation involving gradual increases and decreases in the flow of shaping medium rather than the on-off valving described above by way of example.

As earlier described with reference to the description of the plunger switch assembly 315 shown in FIG. 5, the circuitry also comprises one or more check-point switches (e.g., limit switch 325) which are wired into the press closing circuitry (not shown) to slow down or stop press closure for a predetermined time to permit additional flow of shaping media to correct conditions of undershaping.

Referring specifically to FIG. 5, a control cam 178 is "hook-shaped" in general appearance. The cams 178 attached to the respective cam support plates 210 and 211, rotate in opposite directions around an axis of transmission defined by the axis of shaft 207 fitting coaxially within sleeve 205. The contour surfaces of a cam 178 are interrupted to provide a radial slot 240 for insertion or replacement of a cam on a support plate.

As shown, the control cams 178 have different and varied contour control surfaces. This representation is in accordance with FIGS. 2 and 3 showing different tire bands B being shaped. Thus, though the actual contours of the cams 178 will vary with the particular size, shape or style of the band B, a cam 178 suitable for practice of the invention has the following contour surfaces, or their functional equivalents (reference being made to cam 178L for the purpose of illustration):

(a) A contour 241, beginning at the radial mounting slot 240 and continuing clockwise through an arc segment of about 180–190 degrees. The radius of contour 241 is concentric with the axis of transmission and the length thereof establishes the innermost position of the sensing arm 176L above the lower mold section 21 and toward the band B. As the press begins the closing movement of the mold sections, the cam follower 232 for the cam 178L will be in the position indicated at 232a in FIG. 5. As the cam 178L is rotated counter-clockwise by shaft 107, the cam follower 232 will traverse the surface 241 without producing motion of the sensing arm 176L; and actuator element 300L on cam 178L will actuate switch 305 to release fluid pressure from the cylinder mechanism 35 of left hand forming means 30.

(b) Following contour 241 is a sharply rising contour 242, directed away from the axis of transmission. As the press continues the closing movement and as the shaping of the tire band B begins, the cam 178L will continue counter-clockwise rotation and the cam follower 232 will traverse the surface 242 producing an initial increment of motion of the sensing arm 176L ahead and away from the distending tire band B.

(c) Following contour 242 is a gradually falling contour 243 still directed away from the axis but at a lesser inclination than contour 242. As press closing, band shaping and cam rotation continues, the cam follower 232 will traverse the surface 243 producing an additional increment of motion of the sensing arm 176L ahead and away from this distending tire band B.

It will be noted that although the contours 242 and 243 intersect at a somewhat pointed apex or hump, the physical and geometric relation between a shaping band B and a cam 178 are such that the contours 242 and 243 will produce a movement of the sensing arm 176L which is continuous or "fluid" and without interruption in timed relation with the closing of the press.

(d) Following the traversal of surface 243 by cam follower 232, the lower actuator cam 310 (which is positioned or "time" in a predetermined orientation with relation to control cams 178) will have rotated clockwise into operative engagement with plunger switch assembly 315, thereby actuating final check switch 325. This switch slows or stops press closing for a final check and correction of any undershaping conditions, following which, cam rotation at normal rate is resumed.

(e) Following contour 243 is another sharply rising contour 244 directed away from the axis of transmission. As the press closing and the band shaping are almost completed (e.g., when the mold sections 20 and 21 are perhaps four inches apart), and as the cam rotation continues, the cam follower 232 will produce the final and rapid "runout" motion of the sensing arm away from the distending tire band B and clear from between the approaching mold section, if the arms have not been removed already by cylinder 228.

Following contour 244, the contour surface 245 has a radius concentric with the axis of transmission and the length thereof establishes the inactive or outermost position of the sensing arm 176L.

The sensor or control means 179 is carried adjacent or near the end of the laterally extending portion 215 of a sensing arm 176. As shown, a rotatable roller 250 having a peripheral surface tangent to a tire band B is carried on the end of an arm. Contact of the roller 250 with a distending tire band B could be used to actuate the above-described circuitry to regulate or interrupt the shaping of the tire band until the press closing movement has moved the sensing arm further ahead and away from the tire band.

Referring to FIG. 6, in the press structure disclosed herein by way of representative illustration, pressure shaping and curing medium is introduced through a manifold or chamber 251 into the interior of a bag 30. The manifold 251 is supplied through an inlet pipe 252. Exhaust or condensate of curing medium from the bag is through outlet pipe 253.

As shown, supply of shaping medium to pipe 252 may be controlled by a diaphragm valve 254. A signal derived from the roller 250 could be transmitted through suitable electrical wiring, as described above, to the valve 254, interrupting, reducing or regulating the supply of shaping medium as desired.

The sensor means 179 need not necessarily employ electrical actuation elements such as the roller switch 250. Alternatively, air sensitive elements similar to an Askania system, or photoelectric, or pneumatic sensing elements, or other inferential or proximity sensors or incremental transducers could be employed so long as such elements are adaptable to be carried by sensing arms 176 and so long as a signal derived therefrom can be transmitted to a remote element such as the diaphragm valve 254.

The above disclosure and description is considered adequate to enable a person skilled in this art to practice the invention. It will be understood that variations from the disclosure, particularly in the environmental press structure, could be employed without departing from the basic concepts of the invention. It will be further understood that although disclosed as installed on a dual mold press, the control mechanism 175 could be employed with equal facility on a single mold press. Therefore, it is appropriate that the scope of the invention disclosed herein shall be determined solely by the scope of the claims.

What is claimed is:

1. A mechanism for controlling the shaping of unvulcanized tire bands in a press having relatively movable mold sections, comprising, a sensing arm rotatably movable in a plane normal to the axis of a shaping band while said band is being shaped and before mating engagement of said mold sections, a transmission means correlating the approaching movement of said mold sections with the shaping of said band, a control cam in said transmission means having a contour surface with a configuration preselected according to the construction characteristics of said band, said control cam being operative to program to movement of said sensing arm ahead and away from said shaping band, arm sensor means carried by said arm for interrupting said band shaping upon contact of said band with said arm, cam means carried by said transmission means, and switch means sequentially actuated by said cam means to control the approaching movement of said mold sections and energize said arm sensor means.

2. In a mechanism (175) to control the shaping of an unvulcanized tire band during closing movements of separable press mold sections; transmission means (177) to synchronize the rate of press closing movement with the rate at which the tire band is shaped, said transmission means including a drive from a rotating element in the drive of said press for said closing movements to a long shaft extending across the press below said mold sections, a bevel gear (195) on the opposite end of said long shaft, said bevel gear (195) meshing with the teeth of a bevel gear (203) and teeth on the lower end of a rotating sleeve (205), said bevel gear (203) being on the end of a shaft (207) extending coaxially through said sleeve (205), rotation of said long shaft and said gear (195) by the press drive imparting corresponding rotation equally but in opposite directions to shaft (207) and sleeve (205), dual control cams (178) rotated in synchronized manner, one by said shaft (207) and the other by said sleeve (205), sensing arms (176) movable in a plane normal to the axis of a shaping band, said sensing arms (176) each having a lever arm (220, 230) with cam follower means (222, 232) thereon, means (228) to move each said cam follower means (222, 232) into contact with said control cams (178), an actuator cam (310) rotated by said sleeve (205), and switch means (315) mounted radially outwardly of said sleeve (205) and positioned for actuation by said actuator cam (310).

3. In a mechanism for controlling the shaping of unvulcanized tire bands in a press having relatively movable mold sections, a control circuit comprising; first sensor means adapted to continuously detect the relative positions of said mold sections during the closing movement thereof, said first sensor means sequentially regulating said closing movement, movable second sensor means connected in series with and energized through said first sensor means, said second sensor means being responsive to the rate of radial distension of a tire band being shaped in a tire press, the movement of said movable second sensor means being continuously correlated and synchronized with said closing movement of said mold sections, and output means connected in series with said first and second sensor means to regulate the shaping of said tire band.

4. In a mechanism for controlling the shaping of unvulcanized tire bands in a press having relatively movable mold sections, a control circuit, according to claim 3, wherein said first sensor means comprises, a cam-actuated plunger switch assembly (315) connected in the press closing circuit of said press to regulate the closing movement thereof.

5. In a mechanism for controlling the shaping of unvulcanized tire bands in a press having relatively movable mold sections, a control circuit, according to claim 3, wherein said second sensor means comprises, an arm-mounted switch (250), said switch adapted to be electrically opened by said tire band when the rate of radial distension thereof exceeds a predetermined rate of mold closing movement.

6. In a mechanism (175) to control the shaping of an unvulcanized tire band during closing movements of separable press mold sections; transmission means (177) to synchronize the rate of press closing movement with the rate at which the tire band is shaped, said transmission means including a drive from a rotating element in the drive of said press for said closing movements to a long shaft extending across the press below said mold sections, a bevel gear (195) on the opposite end of said long shaft, said bevel gear (195) meshing with the teeth of a bevel gear (203) and teeth on the lower end of a rotating sleeve (205), said bevel gear (203) being on the end of a shaft (207) extending coaxially through said sleeve (205), rotation of said long shaft and said gear (195) by the press drive imparting corresponding rotation equally but in opposite directions to shaft (207) and sleeve (205); and dual control cams (178) rotated in synchronized manner, one by said shaft (107) and the other by said sleeve (205); sensing arms (176) movable in a plane normal to the axis of a shaping band, said sensing arms (176) each having a lever arm (220, 230) with cam follower means (222, 232) thereon; and means (228) to move each said cam follower means (222, 232) into contact with said control cams (178).

7. A mechanism to control the shaping of unvulcanized tire bands during closing movements of a press having relatively movable mold sections, comprising; a sensing arm movable in a plane transverse to the axis of a shaping band, a transmission means correlating the approaching movement of said mold sections with the shaping of said band, a control element in said transmission means moving said sensing arm in a predetermined motion relative to said shaping band, arm sensor means carried by said arm for regulating said band shaping upon actuation of said arm sensor means by proximity thereof to said shaping band, and switch means sequentially actuated by said transmission means to control the approaching movement of said mold sections and energize said arm sensor means.

8. A mechanism, according to claim 7, wherein said transmission means further comprises, cam means carried by said transmission means for sequentialy actuating said switch means.

9. In a tire press for shaping and curing unvulcanized tire bands within separable mold sections and having forming mechanisms centered axially of said mold sections, press drive means for closing the mold sections around a band and means cooperating with a said forming mechanism for the application of shaping pressure interiorly of a band seated on a said mold section in registry with said forming mechanism, a shaping control mechanism located at the side of said mold section, said control mechanism comprising, a sensing arm rotatably mounted with respect to a band having an edge seated on a mold section and arcuately movable in a plane transverse of said forming mechanism and the medial portion of said band, a transmission means synchronizing the closing movement of said mold sections with radial distension of said band by said shaping pressure, interchangeable control cam means in said transmission means having contour configurations preselected according to the construction characteristics of said band, said control cam means being operative to program the movement of said sensing arm away from said distending band while said mold sections are being closed and said band is being shaped and before mating engagement of said mold sections, sensor means on said sensing arm to regulate said shaping pressure upon operative contact of said distending band with said sensor means, actuator cam means carried by said transmission means, and plunger switch means sequentially operated by said actuator cam means to control said press drive means.

References Cited by the Examiner

UNITED STATES PATENTS

| | | | |
|---|---|---|---|
| 2,345,838 | 4/1944 | Soderquist et al. | 18—17 |
| 2,346,519 | 4/1944 | Tornberg | 18—17 |
| 2,946,088 | 7/1960 | Soderquist | 18—17 X |
| 3,067,466 | 12/1962 | Smith et al. | 18—17 |
| 3,079,643 | 3/1963 | Miller et al. | 264—92 |
| 3,140,325 | 7/1964 | Graff | 264—92 |

J. SPENCER OVERHOLSER, *Primary Examiner.*

ROBERT F. WHITE, WILLIAM J. STEPHENSON,
*Examiners.*